Figure 1:
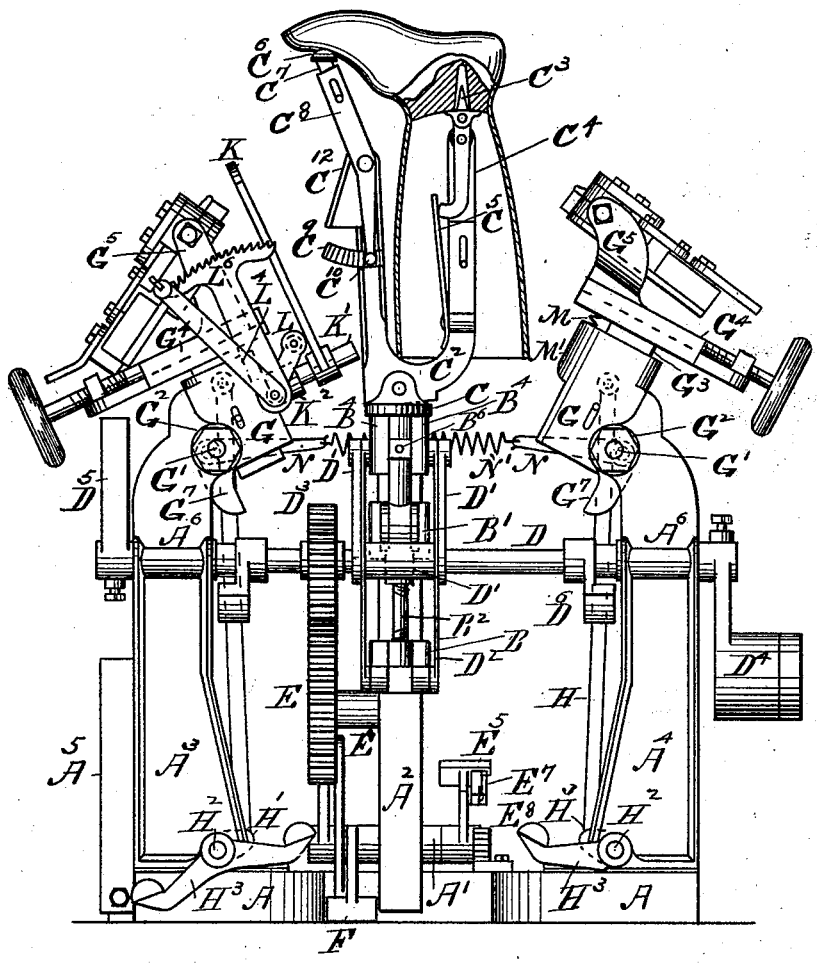

(No Model.) 7 Sheets—Sheet 1.

J. E. CRISP & G. W. COPELAND.
LASTING MACHINE.

No. 501,873. Patented July 18, 1893.

WITNESSES. INVENTORS (No Model.) 7 Sheets—Sheet 2.

J. E. CRISP & G. W. COPELAND.
LASTING MACHINE.

No. 501,873. Patented July 18, 1893.

WITNESSES. INVENTORS (No Model.) 7 Sheets—Sheet 3.

J. E. CRISP & G. W. COPELAND.
LASTING MACHINE.

No. 501,873. Patented July 18, 1893.

WITNESSES.
INVENTORS.

(No Model.) 7 Sheets—Sheet 4.
J. E. CRISP & G. W. COPELAND.
LASTING MACHINE.

No. 501,873. Patented July 18, 1893.

WITNESSES. INVENTORS (No Model.) 7 Sheets—Sheet 6.
J. E. CRISP & G. W. COPELAND.
LASTING MACHINE.
No. 501,873. Patented July 18, 1893.
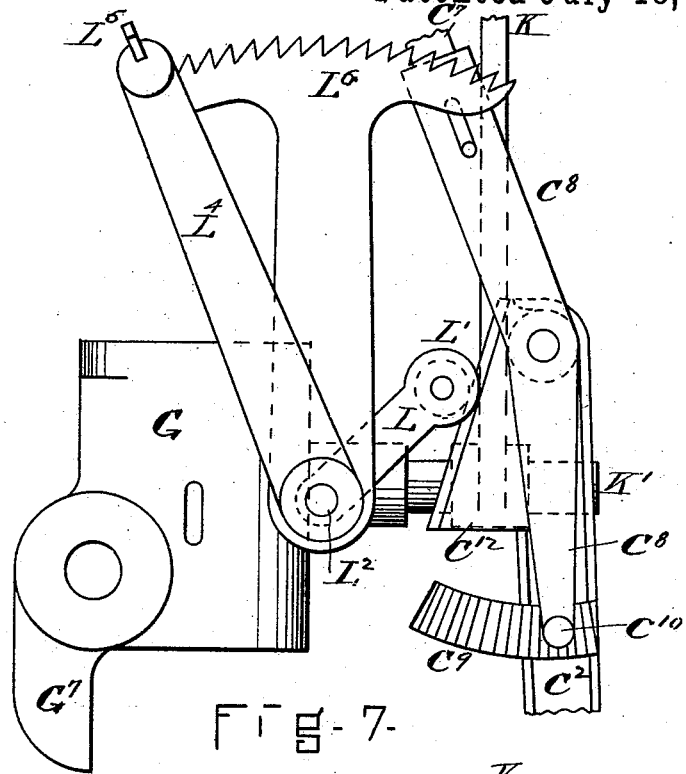
Fig-7-
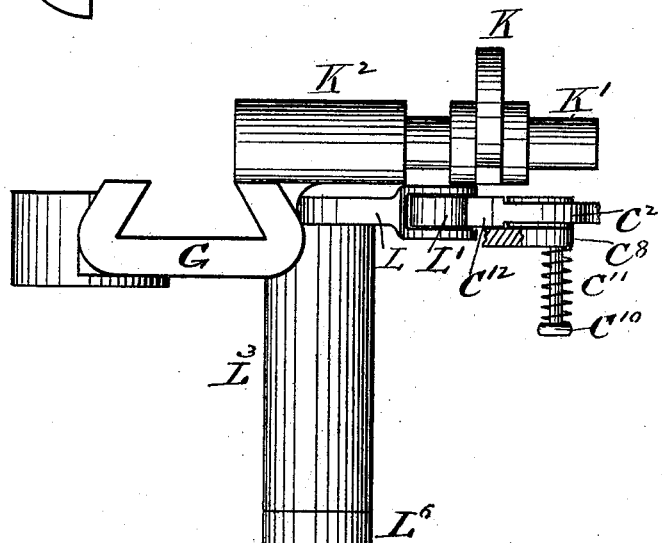
Fig-8
WITNESSES.
INVENTORS
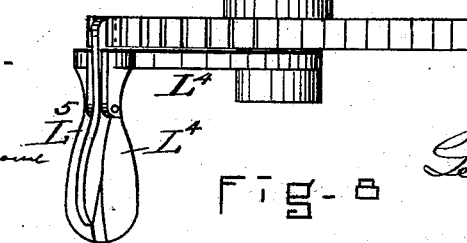

(No Model.)
7 Sheets—Sheet 7.

J. E. CRISP & G. W. COPELAND.
LASTING MACHINE.

No. 501,873. Patented July 18, 1893.

WITNESSES.
G. P. Morrill.
William A. Copeland.

INVENTORS
Jos. E. Crisp.
Geo. W. Copeland.

UNITED STATES PATENT OFFICE.

JOSEPH E. CRISP, OF SOMERVILLE, AND GEORGE W. COPELAND, OF MALDEN, MASSACHUSETTS, ASSIGNORS, BY DIRECT AND MESNE ASSIGNMENTS, TO THE COPELAND RAPID LASTER MANUFACTURING COMPANY, OF MAINE.

LASTING-MACHINE.

SPECIFICATION forming part of Letters Patent No. 501,873, dated July 18, 1893.

Application filed August 15, 1891. Serial No. 402,763. (No model.)

*To all whom it may concern:*

Be it known that we, JOSEPH E. CRISP, of Somerville, and GEORGE W. COPELAND, of Malden, both of the county of Middlesex, in the State of Massachusetts, citizens of said State and of the United States, have invented certain new and useful Improvements in Lasting-Machines, of which the following is a full, clear, and exact description thereof, reference being had to the accompanying drawings, forming a part of this specification.

This invention relates to machines for lasting boots and shoes made of certain grades of material, so that when the same is employed the sides of the boot or shoe, can be lasted economically by the ordinary hand appliances; but the toe and heel portions thereof, where caps and counter stiffeners are used, require the use of plates to insure rapidity and uniformity in lasting.

It consists of mechanism having such construction and mode of operation that will present the last to the operator in the best manner for serial operations to be performed thereon, and that will change the last from one position to the other, as required, with little if any loss of time. This is accomplished by a peculiar construction of the jack, which enables it to be elevated above the lasting heads and inclined forward for jacking, side lasting, and unjacking and the jack can be drawn down and firmly locked into position, between heads, carrying toe and heel lasting plates by one movement of foot treadle mechanism.

The various details of construction, application, combination, and operation are fully explained in the following specification and in the drawings which form an essential part thereof in which—

Figure 2:
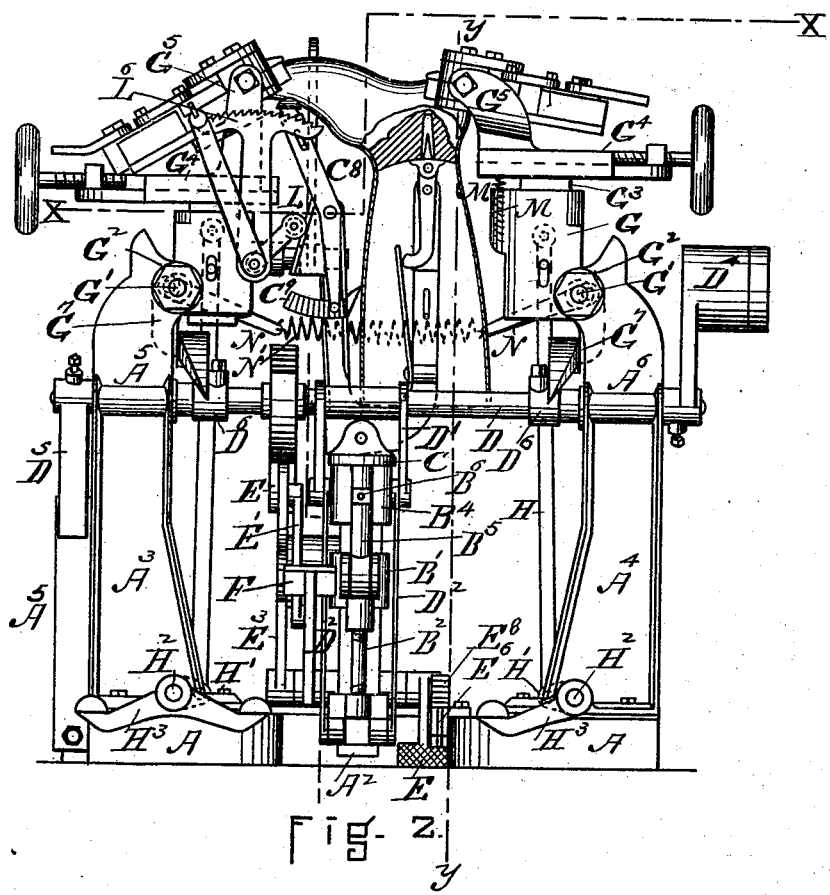
Figure 3:
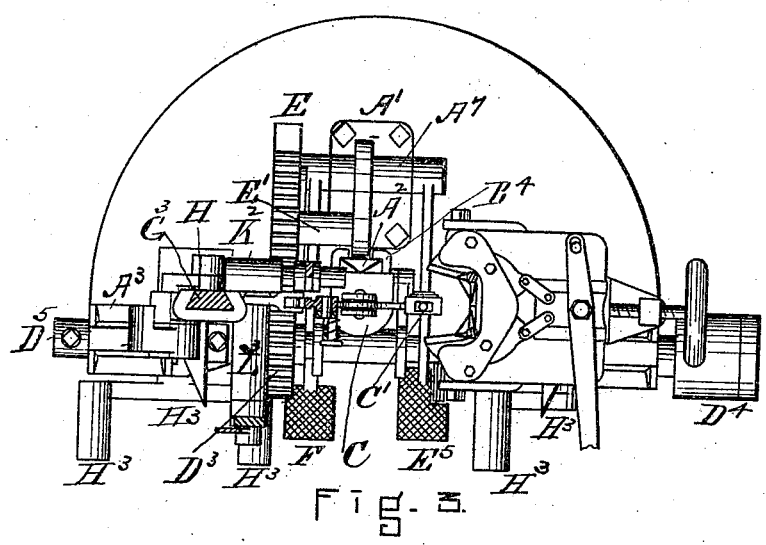
Figure 4:
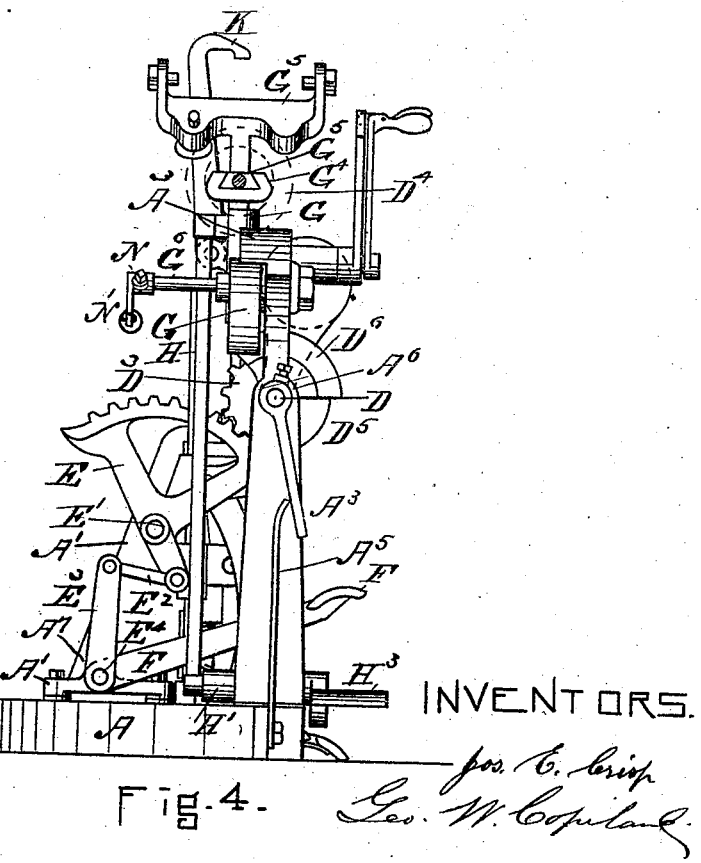
Figure 5:
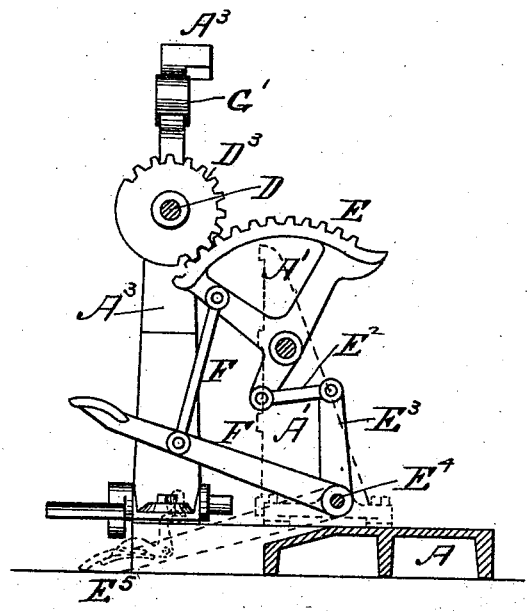
Figure 6:
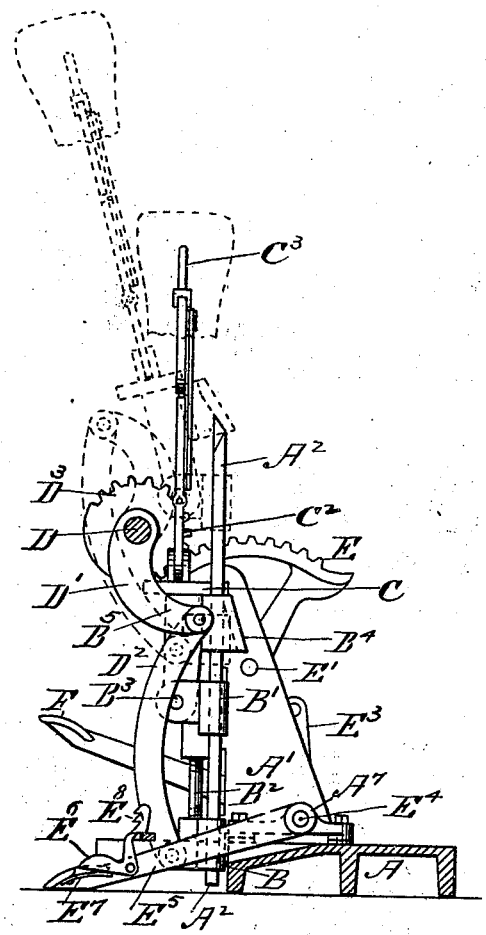
Figure 9:
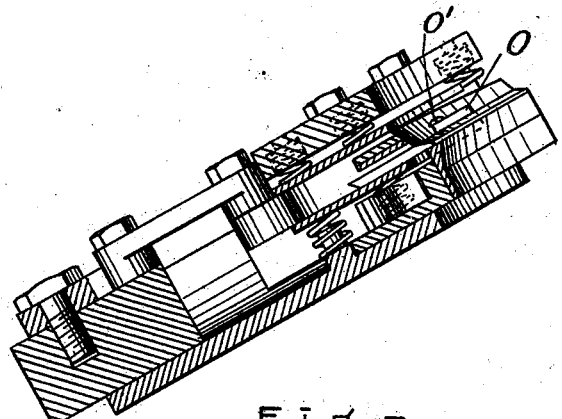
Figure 10:
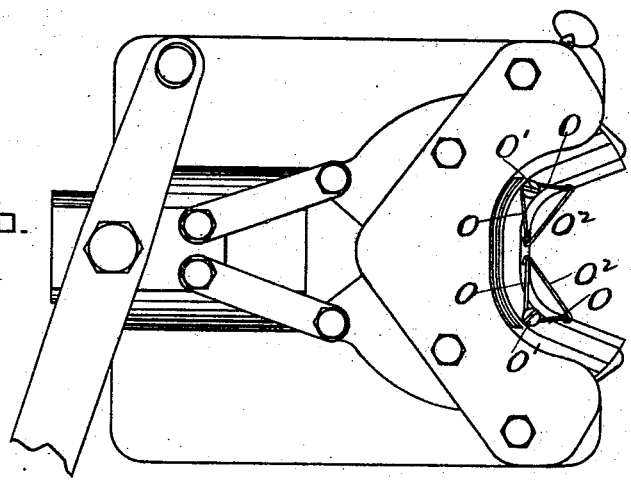
Figure 11:
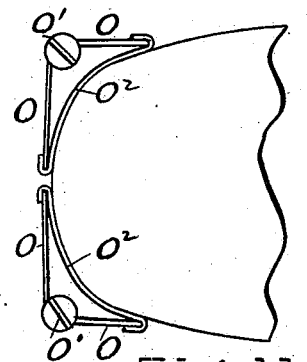

Figure 1 is a front elevation of the machine in position for jacking, unjacking, and side lasting. Fig. 2 is a front elevation showing the jack locked in position for toe and heel lasting. Fig. 3 is a plan of the machine with the jack down, and showing the slide carrying the toe lasting head, vertically, in cross section, on line $x\,x$ Fig. 2. Fig. 4 is an end elevation with the toe lasting head removed.
Fig. 5 is a central cross section, showing the relations of the jack operating mechanism with the operating treadle in front, indicated by dotted lines. Fig. 6 is a central section on line $y\,y$ Fig. 2, showing by full and dotted lines the operative positions of the jack. Figs. 7, 8, are elevation and plan of the swinging guide carrying the toe lasting head, enlarged, showing the means for locking the jack into position. Figs. 9, 10, are section and plan of a lasting head, showing an improved toe-forming device and where it is attached above the lasting plates. Fig. 11 is an enlarged plan of the toe-forming device, showing its operation around the toe.

The jack and its operating mechanism are constructed in the following manner: Upon a base A is fixed a stand A' to which stand is secured the vertical slide $A^2$, and fitted so that they will slide freely thereon, are the sliding heads B. B', connected by the adjusting screw $B^2$, and pivoted to the head B' at $B^3$ is another head $B^4$ which, when the head B is in the position shown by the full lines of Fig. 6, holds the jack it carries vertical, and which when the head B is at its highest position on the slide $A^2$, by reason of the angular tunnel shaped enlargement of the guiding bearings of $B^4$ toward B', swings forward to about the position shown by the dotted lines of Fig. 6. And as by mechanism to be hereinafter described, the head B is always raised to the same height upon the slide $A^2$, operating the screw $B^2$, to change the distance between the heads B. B' will vary the inclination of the jack as desired. Forming part of the swinging head $B^4$ is the socket $B^5$, into which the spindle C' on which the jack revolves is fitted to turn freely, and is secured in place by the collar and pin $B^6$. The support and guide for the jack C, consists of a spindle C' carrying a D shaped head, and fixed to and above this head are two lugs, between which is pivoted the lower part of the jack $C^2$, the straight part of the D shaped head of the spindle C' engaging with the face of the slide $A^2$ whenever the head $B^4$ is vertical, and holds the jack aligned to the center line of the toe and heel lasting heads, Figs. 2, 3, 6. The lower part of the jack $C^2$ is formed of two arms, branching from the base, hung between the lugs upon C, which arms carry an adjustably mounted jack-pin and toe-rest, and this base is hung between the lugs of C so that it will swing to and from the heel lasting head enough to allow the heel of any sized last jacked, to be firmly pressed into the heel band of said head without adjustment thereof. The jack pin and last rest $C^3$ is hung upon the slide bar $C^4$ and this slide bar $C^4$ is adjustable for height upon one of the arms of $C^2$ Fig. 1, a spring $C^5$ acting to press the last upon the jack-pin, down on the toe-rest, in the usual manner. The toe-rest $C^6$ is adjustable for height by its slide $C^7$ sliding in the pivoted bar $C^8$ and this bar $C^8$ is pivoted to the top of the second arm of $C^2$ and swings to and from the jack-pin $C^3$ giving adjustment for length. The pivoted bar $C^8$ is locked in position by the pawl $C^{10}$ which is mounted on its lower end and which is drawn by the spring $C^{11}$ into contact with the ratchet $C^9$ fixed to the same arm of $C^2$ to which $C^8$ is pivoted: Figs. 1, 7, 8. There is an incline $C^{12}$ formed on the end of the branch of $C^2$ to which $C^8$ is pivoted, whose use for pressing back the last will be described in combination with the parts operating therewith.

Fixed to the base A are the stands $A^3$, $A^4$, and on these stands, at $A^6$, are bearings for the shaft D to oscillate in. Attached to this shaft D is the double crank $D'$ whose connecting rods $D^2$ are also connected to each side of the sliding head B, and are far enough apart to straddle the swinging head $B^3$ as shown in Figs. 1 and 6. A pinion $D^3$ is fixed to the shaft D, Figs. 1 and 5, and the segment E is located upon the stand $A'$ at $E'$ so that its teeth will mesh with and revolve the pinion $D^3$ as the foot treadle $E^5$ is operated. A crank-like projection of E is connected to the rocker arm $E^3$ by the connection $E^2$ and the rocker arm $E^3$ is firmly fixed to the rock shaft $E^4$ whose bearing is in the stand $A'$ at $A^7$. Figs. 1, 3, and 4, and also firmly fixed to the other end of this rock shaft is the treadle $E^5$, the depression of which will cause the jack to straighten, and then with its component parts to descend, pass under, and rise up to a gage for height where it is locked by the springs $E^7$ pressing one of the pawls or dogs $E^6$ into a tooth of the ratchet $E^8$ fixed to the base A, Fig. 6. To the end of the shaft D outside of the stand $A^4$ is secured the counter balance $D^4$, which will slightly overbalance the jack and parts operating it, and raise the jack to its upper point of rest, which, with the crank $D'$ is just past the center, so that no force applied to the bottom of a last on the jack can move it downward without the treadle $E^5$ is depressed. To the end of the shaft D outside of the stand $A^3$ is secured the arm $D^5$ which revolves with the shaft D and which engages at the proper point of revolution with the leaf spring $A^5$, fixed to the base A, Fig. 4, and said spring by taking up the acquired momentum of the counter-balance, during the rapid lowering of the jack, between the lasting head, stores and holds sufficient force to start the counter-balance smartly on its return movement when said counterbalance is active in raising the jack from under the lasting heads. The counter-balance $D^4$ and arm $D^5$ are so located upon the shaft D that their hubs contact with the outer sides of the stands $A^3$, $A^4$, so that when the machine is in position for operation of the lasting heads this shaft D is transformed into a tie, which prevents the stands $A^3$, $A^4$, from spreading apart under the stress of heel and toe lasting.

There is another foot treadle F which is hung upon the rock shaft $E^4$, between the bearing $A^7$, and the rocker arm $E^3$, and which can be connected to the segment E by the connection $F'$, should it be desired to last the sides of the upper by moving the last up to the operating nozzle of a tack driving machine; in which case the counter balance $D^4$, is set so that it will raise the jack nearly to the nozzle, and then require a depression of the treadle F to raise the jack for the purpose of operating the tack driver. The general preference however seems to be for a suspended tack driver with sufficient range to cover both positions of jack. The toe and heel lasting heads are similarly hung upon the top of the stands $A^3$, $A^4$, so that they can be swung toward each other by the cams $B^6$ at proper times, to close over the jack after it descends below the line of the lasting plates, and they are arranged and operated as follows, a description of one serving for both.

A swinging guide G, Fig. 7, is fixed upon a pivot pin $G'$ and this pivot is hung in the bearing $G^2$, on the upper ends of the stands $A^3$, $A^4$, so that it can be swung into the positions shown in Figs. 1 and 2, and fitted to this guide G, is the slide $G^3$ which is connected by the rod H, to the crank $H'$, the shaft of which, $H^2$, is mounted in a bearing at the lower end of the stands $A^3$, $A^4$, and which shaft has fixed to its outer end the foot treadle $H^3$, which treadle is double ended for the toe lasting head and single for the heel lasting head. The slide $G^3$, carries at right angles to its line of motion, a guide $G^4$, Figs. 1, 2, 3, and 4, in which slides the frame $G^5$, upon which are hung the lasting heads, which can be adjusted to any desired degree of inclination. Hand-wheels and screws, Fig. 2, adjust the frame $G^5$, and the lasting heads carried thereon, for varying lengths of lasts, in the usual manner.

A gage for height K, Figs. 1, 2, 3, and 4, which positions the last for the action of the lasting plates, is fitted to slide to the desired position on the slide $K'$, and the slide $K'$ is firmly fixed in a projecting hub $K^2$, formed for this purpose, upon the swinging guide G of the toe lasting head, see enlarged Figs. 7, and 8.

A brace L, is mounted upon the swinging guide G, of the toe lasting head, to press against the incline $C^{12}$ of the jack and thereby force the last, jacked and positioned for height, back into the heel band of the heel lasting head. The outer end of the brace L, engages with the sides of the incline $C^{12}$, to give the jack central location, by combined action with the heel band, and it carries the roll L', pivoted therein, which roll L', runs on the face of the incline $C^{12}$, Figs. 7, 8. This brace is carried by and forms part of the shaft $L^2$, which shaft has its bearing in the hub $L^3$, forming part of G. To the outer end of the shaft $L^2$, is fixed the lever and handle $L^4$, the handle having the spring latch or pawl $L^5$, which by engaging with the ratchet $L^6$, fixed on the hub $L^4$, holds the brace L in any desired position. The toe lasting head and its attachment rest upon the guide G and are to be moved up by the double ended treadle during the toe lasting process, while the heel lasting head and its attachments are held up by the spring M, located in the socket M' and are to be moved down during the heel lasting process. The gage for height K, the jack pin $C^3$, and the toe rest $C^6$, are relatively adjusted to each other and to the position of the lasting plates, so that when firmly held in position for heel and toe lasting, the inner sole at the heel will be below the line of the heel lasting plates, and the inner sole at the toe will be considerably above the line of the toe lasting plates, so that said plates may be used during the upward motion of the head to mold the upper around the toe of the last before the plates are up to the line where their folding action can commence.

To the prolongations $G^6$ of the pivot pins of the toe and heel lasting heads, are fixed the levers N, Figs. 1, 2, 4, and the ends of these levers are connected together by the spring N' so that the spring will draw back the swinging guides G against the stops forming part of the top of the stands $A^3$, $A^4$, Fig. 1, when the jack is elevated.

As the shaft D is revolved to draw the shaft down, as hereinbefore described, the cams $D^6$, properly fixed thereto, at the correct time, engage with the arms $G^7$, operating their respective heads and swing those heads into position, Fig. 2; the heads reaching the place of rest just after the jack commences to raise the last toward the rest K.

The operation of transferring the jack from the position Fig. 1 to that of Fig. 2, is as follows, viz: With the last nearly in correct lineal position, the operator places his foot upon the foot plate of the treadle $E^5$, clear of the spring locking dogs $E^6$, and presses lightly thereon, and as the various parts are correctly balanced the crank D' commences to revolve drawing down the swinging head $B^3$ against the inclined head of the slide A, and this downward movement of the head $B^3$ causes the jack to move into vertical position. When the jack has reached a vertical position the straight side of the D-shaped head of the spindle C', contacts with the face of the slide C and assures correct lineal position of the jack; the operator then throws his full weight upon the treadle $E^5$, and the jack rapidly descends until the crank D' passes its center and slings the inner sole up against the gage for height K, and one of the dogs $E^6$, engages with the ratchet $E^8$, and there firmly holds the jack. When the jack is about three-quarters down, the cams $D^6$, engage with the arms $G^7$, carry and hold the spring balanced heads into position for operating, and about the time the inner sole has reached the gage for height the operator draws the handle $L^4$, toward the heel lasting head and firmly locks the last back into the heel band. The above described operation takes two or three seconds. To return the jack to the position Fig. 1, the operator releases the handle $L^4$ and presses firmly down upon the foot piece of $E^5$, then touches the toe pieces of the dogs $E^6$, with his toe and the storage spring $D^5$ gives the counter balance $D^4$ a quick start and the various parts return in the reverse order to the position required.

Figs. 9, 10, 11, show an improved device for forming the upper around the toe of the last by the upward rise of the toe lasting head before the plates commence their folding action, without changing its relation to the lasting plates. This consists of two strong springs O, right angular in form, swung above the lasting plates by their corners O', so that two of their ends will nearly meet at the median line of the last and their other arms will be about parallel with the sides of the last. Stretched by their elasticity between the ends of, and forming the hypotenuse of the right angular springs, is a flexible band of any desired material which at rest will assume about the position shown by Fig. 10; and which in use automatically will conform to and press the upper evenly around the toe portion of any size or shape of toe last, by pressing either the bands toward the toe or the toe toward the bands as shown in Fig. 11.

Having thus described our invention, what we claim, and desire to secure by Letters Patent, is—

1. In a lasting machine for boots and shoes, heel and toe lasting heads mounted in carriers pivoted to the standards, and also independently pivoted for adjustment, and an intermediate pivoted jack, in combination with mechanism substantially as described for raising said jack above the heads for hand lasting, and a treadle and intermediate connecting mechanism for drawing down said jack between the heads and locking it, in position for machine lasting, by one movement of the treadle substantially as set forth.

2. In a lasting machine for boots and shoes heel and toe lasting heads mounted in carriers pivoted to the standards, and also independently pivoted for adjustment, and an intermediate pivoted jack, in combination with mechanism substantially as described for raising said jack above the heads for hand lasting, and a treadle and intermediate connecting mechanism for swinging said jack from an inclined to a vertical position and then drawing down said jack between the heads and locking it in position for machine lasting, by one movement of the treadle substantially as set forth.

3. In a lasting machine of the class described, the combination of the spring $A^5$, affixed to the base of the machine, the counter balance $D^4$ and the lever $D^5$, affixed to the jack operating mechanism, said jack operating mechanism, and lasting mechanism, all substantially as and for the purposes set forth.

4. In a lasting machine of the class described having heel and toe lasting mechanism, the combination therewith of a jack and operating mechanism substantially as described provided with an auxiliary treadle F and suitable connecting mechanism all operating substantially as described.

5. In a lasting machine head, a toe or heel conforming band, comprising two independent flexible bands, elastically mounted upon and above the lasting plates carried by said head, in combination with the lasting plates and suitable operating mechanism therefor, whereby the conforming band is actuated by and in advance of the operative motions of said plates substantially as described and for the purposes set forth.

JOS. E. CRISP.
GEO. W. COPELAND.

Witnesses:
A. L. COPELAND,
Z. W. PHELLEN.